(12) United States Patent
Rychlik et al.

(10) Patent No.: US 8,689,037 B2
(45) Date of Patent: Apr. 1, 2014

(54) SYSTEM AND METHOD FOR ASYNCHRONOUSLY AND INDEPENDENTLY CONTROLLING CORE CLOCKS IN A MULTICORE CENTRAL PROCESSING UNIT

(75) Inventors: Bohuslav Rychlik, San Diego, CA (US); Ali Iranli, San Diego, CA (US); Brian J. Salsbery, Boulder, CO (US); Sumit Sur, Boulder, CO (US); Steven S. Thomson, San Diego, CA (US); Robert A. Glenn, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/944,321

(22) Filed: Nov. 11, 2010

(65) Prior Publication Data

US 2011/0145624 A1    Jun. 16, 2011

Related U.S. Application Data

(60) Provisional application No. 61/286,967, filed on Dec. 16, 2009.

(51) Int. Cl.
G06F 1/04       (2006.01)
G06F 1/12       (2006.01)
G06F 5/06       (2006.01)

(52) U.S. Cl.
USPC ............................................. 713/600

(58) Field of Classification Search
USPC .................................. 713/300, 600
See application file for complete search history.

(56) References Cited

U.S. PATENT DOCUMENTS

| 5,644,769 | A  | 7/1997  | Hasiguti        |
| 6,076,171 | A  | 6/2000  | Kawata          |
| 6,804,632 | B2 | 10/2004 | Orenstien et al.|
| 6,829,713 | B2 | 12/2004 | Cooper et al.   |
| 6,978,389 | B2 | 12/2005 | Jahnke          |
| 7,043,405 | B2 | 5/2006  | Orenstien et al.|
| 7,058,824 | B2 | 6/2006  | Plante et al.   |
| 7,107,187 | B1 | 9/2006  | Saghier et al.  |
| 7,133,806 | B2 | 11/2006 | Prasad          |

(Continued)

FOREIGN PATENT DOCUMENTS

| EP | 0098169 A2 | 1/1984 |
| EP | 0942363 A2 | 9/1999 |

(Continued)

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

(Continued)

Primary Examiner — Mohammed Rehman
(74) Attorney, Agent, or Firm — Nicholas A. Cole

(57) ABSTRACT

A method of controlling core clocks in a multicore central processing unit is disclosed and may include executing a zeroth dynamic clock and voltage scaling (DCVS) algorithm on a zeroth core and executing a first DCVS algorithm on a first core. The zeroth DCVS algorithm may operable to independently control a zeroth clock frequency associated with the zeroth core and the first DCVS algorithm may be operable to independently control a first clock frequency associated with the first core.

4 Claims, 6 Drawing Sheets

(56) References Cited

U.S. PATENT DOCUMENTS

| | | |
|---|---|---|
| 7,134,031 B2 | 11/2006 | Flautner |
| 7,219,245 B1 | 5/2007 | Raghuvanshi |
| 7,233,188 B1 | 6/2007 | Takano et al. |
| 7,263,457 B2 | 8/2007 | White et al. |
| 7,369,967 B1 | 5/2008 | Washburn et al. |
| 7,370,189 B2 | 5/2008 | Fischer et al. |
| 7,398,407 B2 | 7/2008 | Jorgenson et al. |
| 7,401,240 B2 | 7/2008 | Heller, Jr. et al. |
| 7,437,581 B2 | 10/2008 | Grochowski et al. |
| 7,467,291 B1 | 12/2008 | Cockroft et al. |
| 7,500,124 B2 | 3/2009 | Seo |
| 7,543,161 B2 | 6/2009 | Olszewski et al. |
| 7,669,067 B2 | 2/2010 | Degenhardt |
| 7,689,838 B2 | 3/2010 | Srinivasan et al. |
| 7,711,966 B2 | 5/2010 | Prabhakaran et al. |
| 7,783,906 B2 | 8/2010 | Turner et al. |
| 2002/0046354 A1 | 4/2002 | Ostrom et al. |
| 2002/0188877 A1 | 12/2002 | Buch |
| 2003/0115495 A1 | 6/2003 | Rawson, III |
| 2004/0225902 A1 | 11/2004 | Cesare et al. |
| 2004/0254765 A1 | 12/2004 | Lee et al. |
| 2005/0102560 A1 | 5/2005 | Taketoshi et al. |
| 2006/0036878 A1 | 2/2006 | Rothman et al. |
| 2006/0123253 A1 | 6/2006 | Morgan et al. |
| 2006/0149975 A1* | 7/2006 | Rotem et al. ............... 713/300 |
| 2007/0033425 A1 | 2/2007 | Clark |
| 2007/0033526 A1 | 2/2007 | Thompson et al. |
| 2007/0156370 A1* | 7/2007 | White et al. ............... 702/132 |
| 2007/0255929 A1 | 11/2007 | Kasahara et al. |
| 2008/0005591 A1 | 1/2008 | Trautman et al. |
| 2008/0028244 A1 | 1/2008 | Capps et al. |
| 2008/0168287 A1 | 7/2008 | Berry et al. |
| 2008/0201591 A1 | 8/2008 | Hu et al. |
| 2008/0310099 A1* | 12/2008 | Monferrer et al. ............ 361/687 |
| 2009/0037922 A1 | 2/2009 | Herington |
| 2009/0049314 A1 | 2/2009 | Taha et al. |
| 2009/0106576 A1* | 4/2009 | Jacobowitz et al. .......... 713/501 |
| 2009/0150695 A1 | 6/2009 | Song et al. |
| 2009/0150696 A1 | 6/2009 | Song et al. |
| 2009/0187775 A1 | 7/2009 | Ishikawa |
| 2009/0217276 A1 | 8/2009 | Brenner et al. |
| 2009/0230930 A1* | 9/2009 | Jain et al. ............... 323/234 |
| 2009/0249347 A1 | 10/2009 | Henmi |
| 2009/0271646 A1* | 10/2009 | Talwar et al. ............... 713/322 |
| 2009/0276642 A1 | 11/2009 | Burton et al. |
| 2010/0076733 A1 | 3/2010 | Kumar et al. |
| 2010/0122101 A1* | 5/2010 | Naffziger et al. ............. 713/340 |
| 2011/0023047 A1* | 1/2011 | Memik et al. ............... 718/104 |
| 2011/0145559 A1 | 6/2011 | Thomson et al. |
| 2011/0145605 A1 | 6/2011 | Sur et al. |
| 2011/0145615 A1 | 6/2011 | Rychlik et al. |
| 2011/0145616 A1 | 6/2011 | Rychlik et al. |
| 2011/0145617 A1 | 6/2011 | Thomson et al. |
| 2011/0145824 A1 | 6/2011 | Thomson et al. |
| 2013/0074085 A1 | 3/2013 | Thomson et al. |
| 2013/0151879 A1 | 6/2013 | Thomson |

FOREIGN PATENT DOCUMENTS

| | | |
|---|---|---|
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| WO | WO0225414 A2 | 3/2002 |
| WO | WO-02074046 A2 | 9/2002 |
| WO | WO-2004044720 A2 | 5/2004 |
| WO | WO2005119412 A1 | 12/2005 |
| WO | 2006037119 A2 | 4/2006 |
| WO | 2007007300 A2 | 1/2007 |
| WO | 2008047179 A1 | 4/2008 |

OTHER PUBLICATIONS

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.

International Search Report and Written Opinion—PCT/US2010/059560—ISA/EPO—Jun. 15, 2011.

International Search Report and Written Opinion—PCT/US2010/059562, ISA/EPO—May 27, 2011.

International Search Report and Written Opinion—PCT/US2010/058075—ISA/EPO—Apr. 27, 2011.

International Search Report and Written Opinion—PCT/US2010/059535, ISA/EPO—Apr. 28, 2011.

International Search Report and Written Opinion—PCT/US2010/059538, International Search Authority—European Patent Office—Apr. 7, 2011.

Semeraro et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.

iDebian, CPU frequency scaling in Linux, Jun. 26, 2008, iDebian's Weblog.

Stallings, W., "Operating systems internals and design principles," 2005, Pearson, 5th edition, section 3.2, pp. 111-126.

Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.

* cited by examiner

SYSTEM AND METHOD FOR ASYNCHRONOUSLY AND INDEPENDENTLY CONTROLLING CORE CLOCKS IN A MULTICORE CENTRAL PROCESSING UNIT

RELATED APPLICATIONS

The present application claims priority to U.S. Provisional Patent Application Ser. No. 61/286,967, entitled SYSTEM AND METHOD OF ASYNCHRONOUSLY AND INDEPENDENTLY CONTROLLING CORE CLOCKS IN A MULTICORE CENTRAL PROCESSING UNIT, filed on Dec. 16, 2009, the contents of which are fully incorporated by reference.

CROSS-REFERENCED APPLICATIONS

The present application is related to, and incorporates by reference, U.S. patent application Ser. No. 12/944,140, entitled SYSTEM AND METHOD FOR CONTROLLING CENTRAL PROCESSING UNIT POWER BASED ON INFERRED WORKLOAD PARALLELISM, by Rychlik et al., filed concurrently. The present application is related to, and incorporates by reference, U.S. patent application Ser. No. 12/944,202, entitled SYSTEM AND METHOD FOR CONTROLLING CENTRAL PROCESSING UNIT POWER IN A VIRTUALIZED SYSTEM, by Rychlik et al., filed concurrently. The present application is related to, and incorporates by reference, U.S. patent application Ser. No. 12/944,378, entitled SYSTEM AND METHOD FOR CONTROLLING CENTRAL PROCESSING UNIT POWER WITH REDUCED FREQUENCY OSCILLATIONS, by Thomson et al., filed concurrently. The present application is related to, and incorporates by reference, U.S. patent application Ser. No. 12/944,467, entitled SYSTEM AND METHOD FOR CONTROLLING CENTRAL PROCESSING UNIT POWER WITH GUARANTEED TRANSIENT DEADLINES, by Thomson et al., filed concurrently. The present application is related to, and incorporates by reference, U.S. patent application Ser. No. 12/944,561, entitled SYSTEM AND METHOD FOR CONTROLLING CENTRAL PROCESSING UNIT POWER WITH GUARANTEED STEADY STATE DEADLINES, by Thomson et al., filed concurrently. The present application is related to, and incorporates by reference, U.S. patent application Ser. No. 12/944,564, entitled SYSTEM AND METHOD FOR DYNAMICALLY CONTROLLING A PLURALITY OF CORES IN A MULTICORE CENTRAL PROCESSING UNIT BASED ON TEMPERATURE, by Sur et al., filed concurrently.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
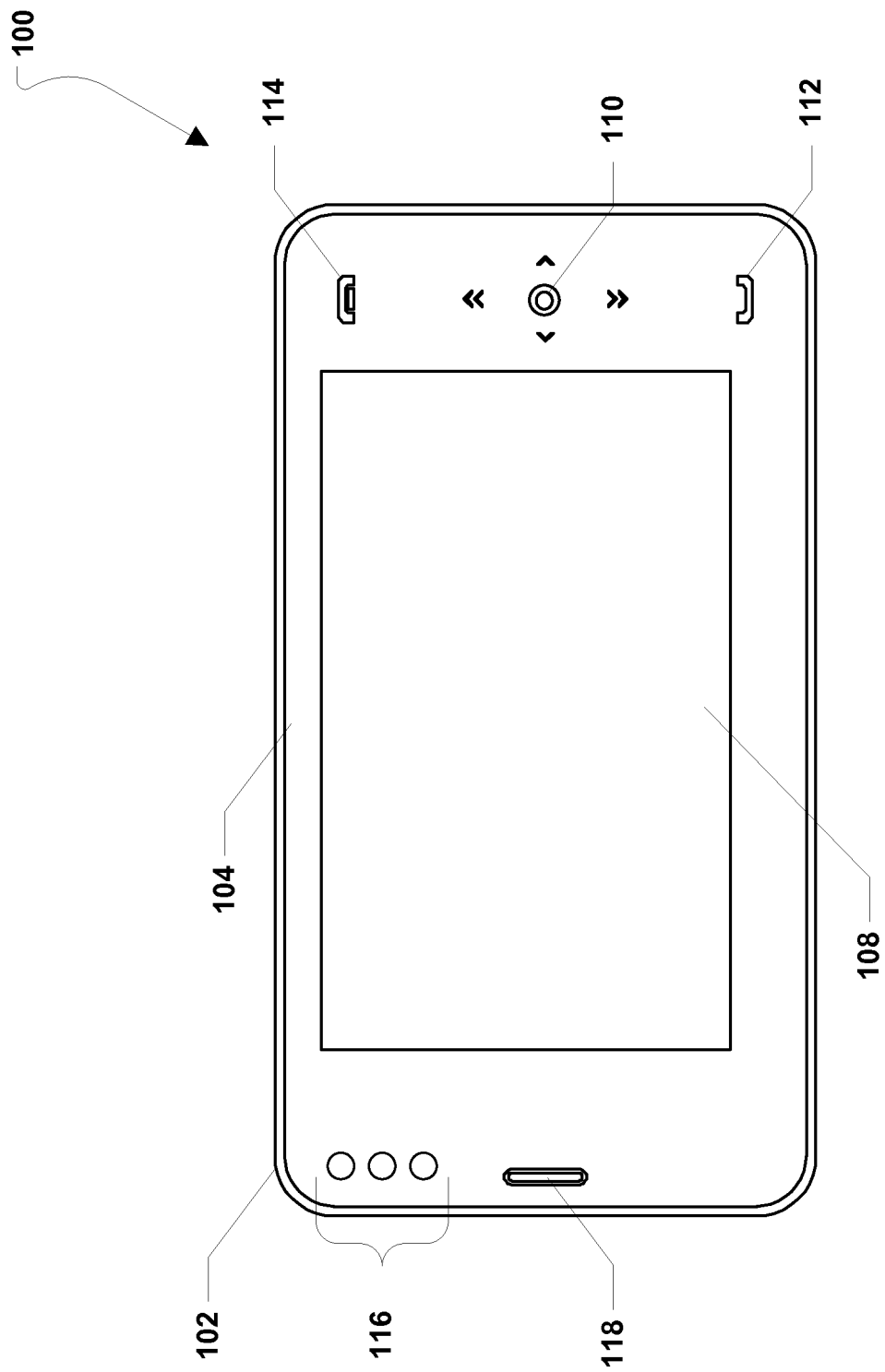
FIG. 1 is a front plan view of a first aspect of a portable computing device (PCD) in a closed position.
Figure 2:
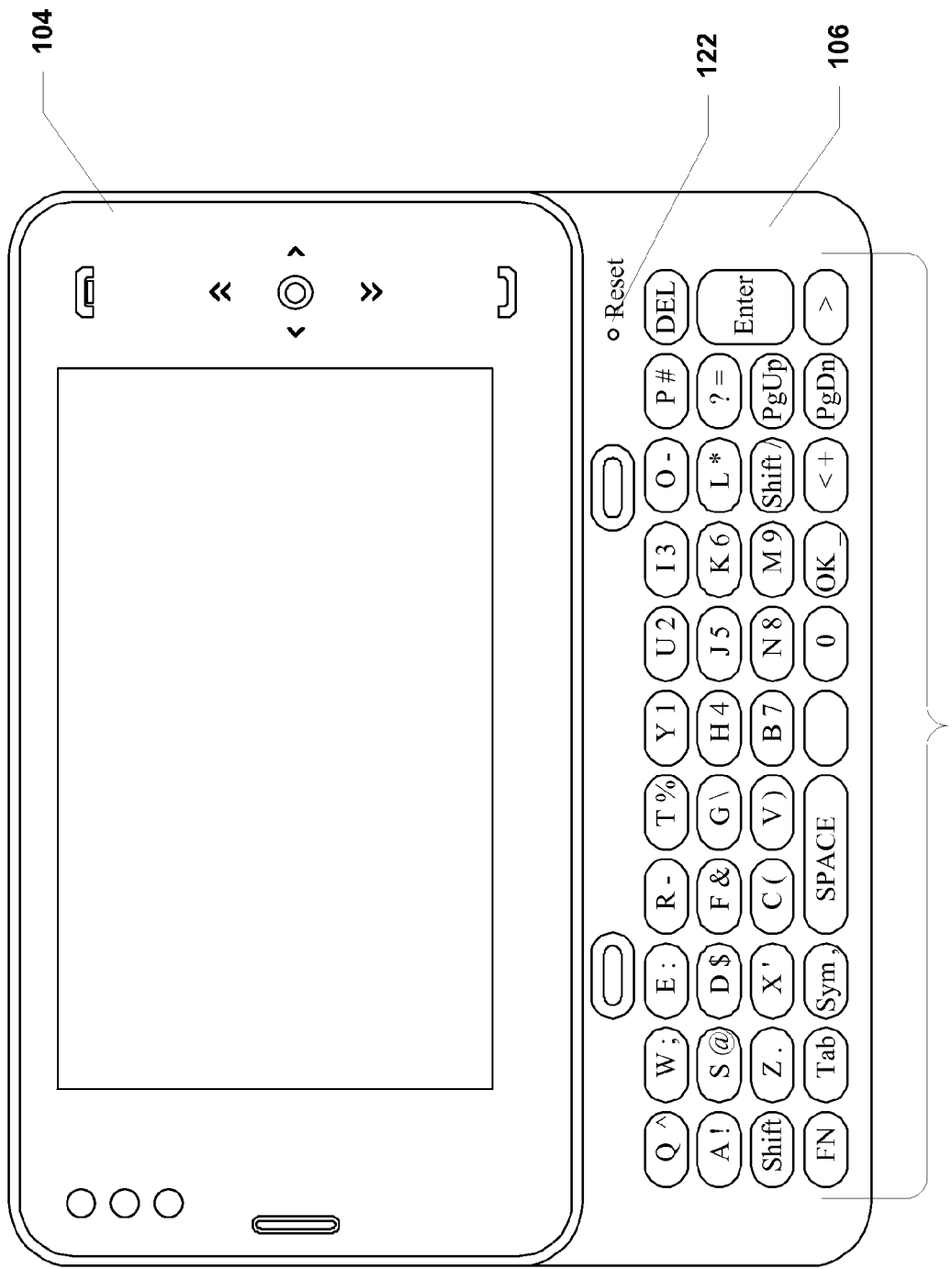
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
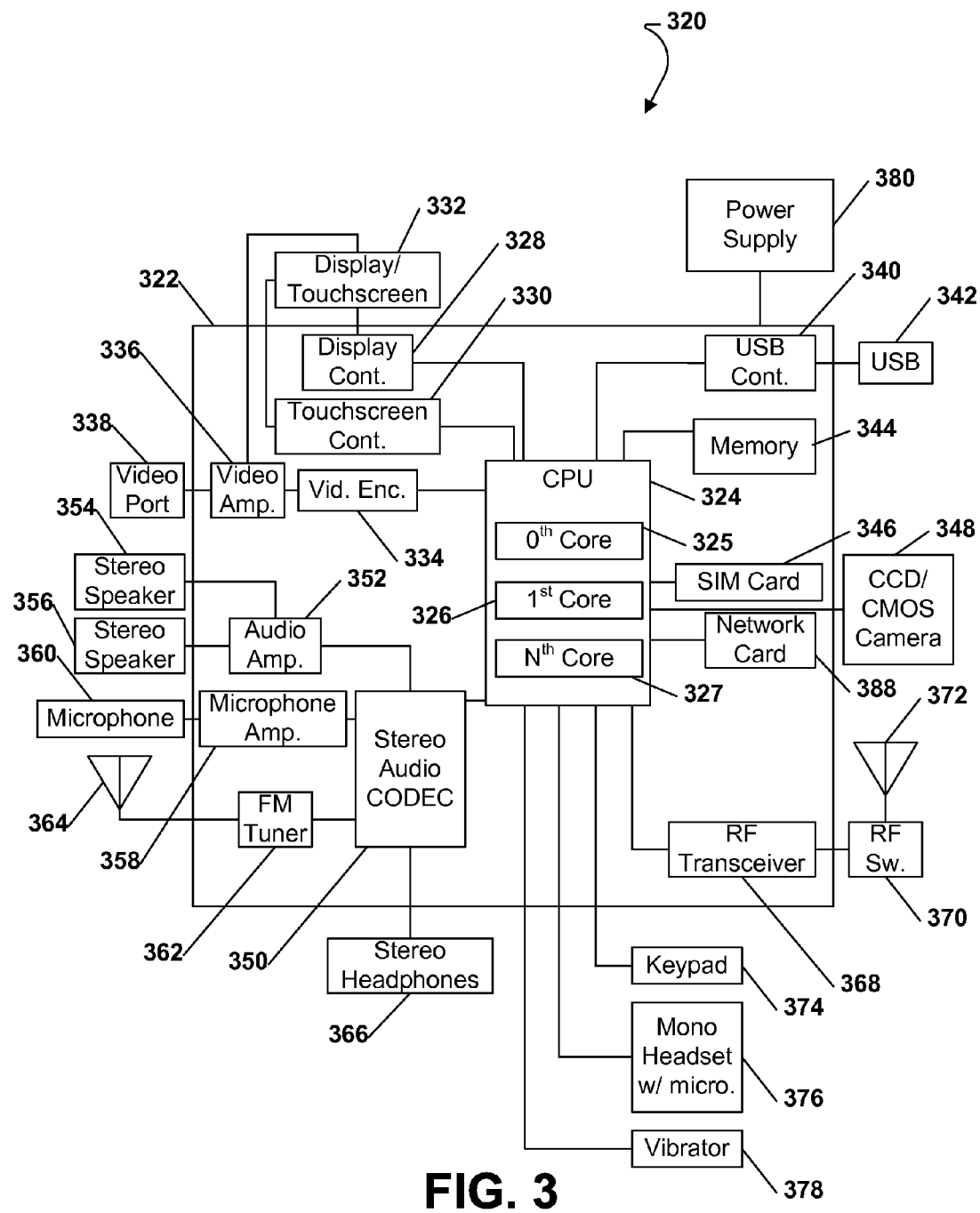
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a touch screen display display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324.

Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to control a clock associated with each CPU, or core, of the multicore CPU 324.

Figure 4:
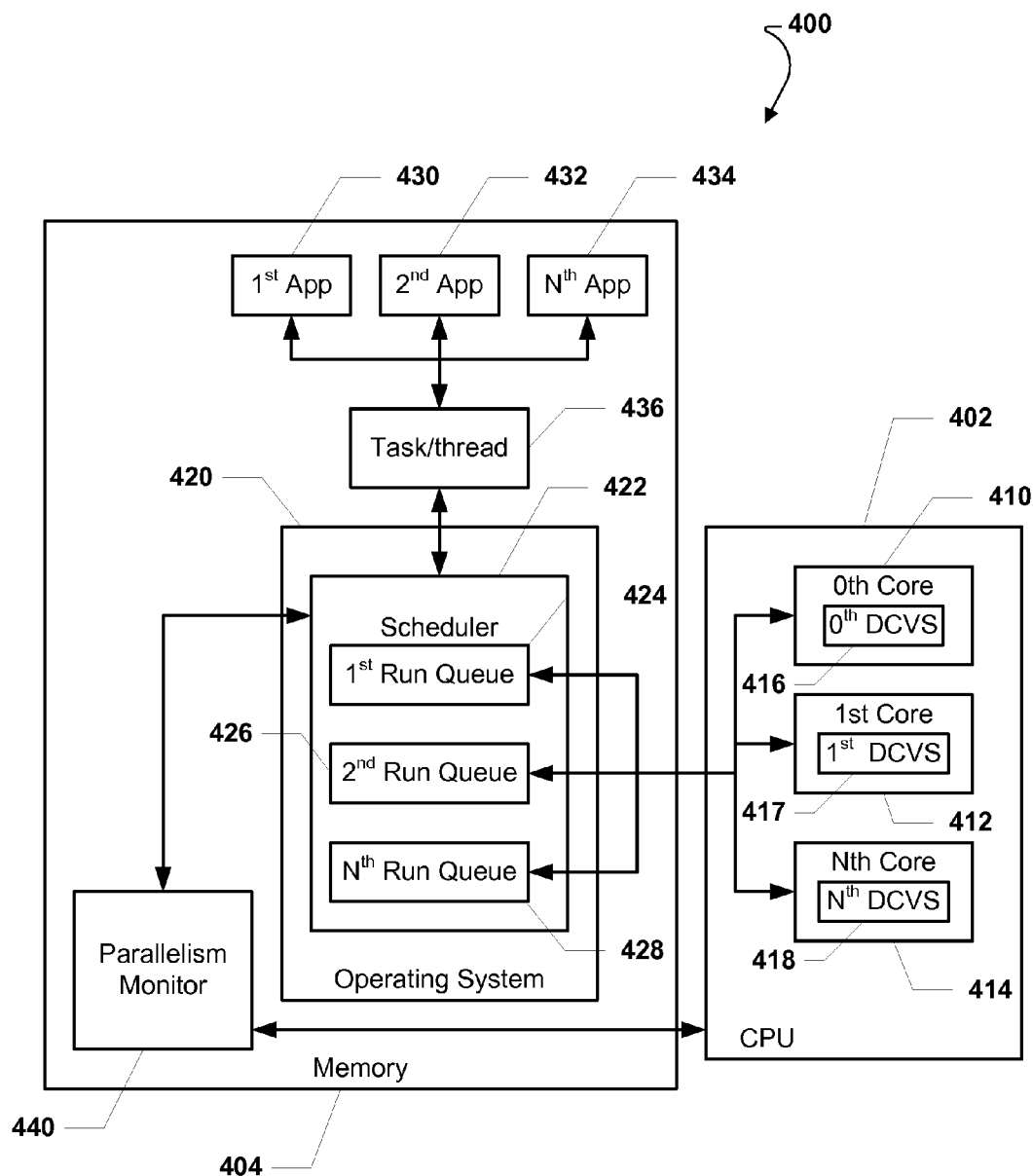
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414. Further, each DCVS algorithm 416, 417, 418 may be executed completely independently on each respective core 410, 412, 414 multiple cores. Also, there is one instance of a DCVS algorithm 416, 417, 418 per core 410, 412, 414 and DCVS algorithm 416, 417, 418 may monitor and control the clock of the core 410, 412, 414 in which it is executed. Each DCVS algorithm 416, 417, 418 may independently set a different clock frequency for each cores 410, 412, 414.

In a particular aspect, each DCVS algorithm 416, 417, 418 may be identical and each may monitor the same parameter, e.g., idle time, workload, etc. In another aspect, each DCVS algorithm 416, 417, 418 may be identical, but each may monitor a different parameter. In another aspect, each DCVS algorithm 416, 417, 418 may be different, but each may monitor the same parameter. In still another aspect, each DCVS algorithm 416, 417, 418 may be different and each may monitor a different parameter.

In another aspect, the zeroth DCVS algorithm 416 may utilize the idle information from the zeroth core 410, the first core 412, the Nth core 414, or any combination thereof. The first DCVS algorithm 417 may utilize the idle information from the zeroth core 410, the first core 412, the Nth core 414, or any combination thereof. Also, the Nth DCVS algorithm 418 may utilize the idle information from the zeroth core 410, the first core 412, the Nth core 414, or any combination thereof.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 stored thereon. The parallelism monitor 440 may be connected to the operating system 420 and the multicore CPU 402. Specifically, the parallelism monitor 440 may be connected to the scheduler 422 within the operating system 420. As described herein, the parallelism monitor 440 may monitor the workload on the cores 410, 412, 414 and the parallelism monitor 440 may control the power to the cores 410, 412, 414.

Figure 5:
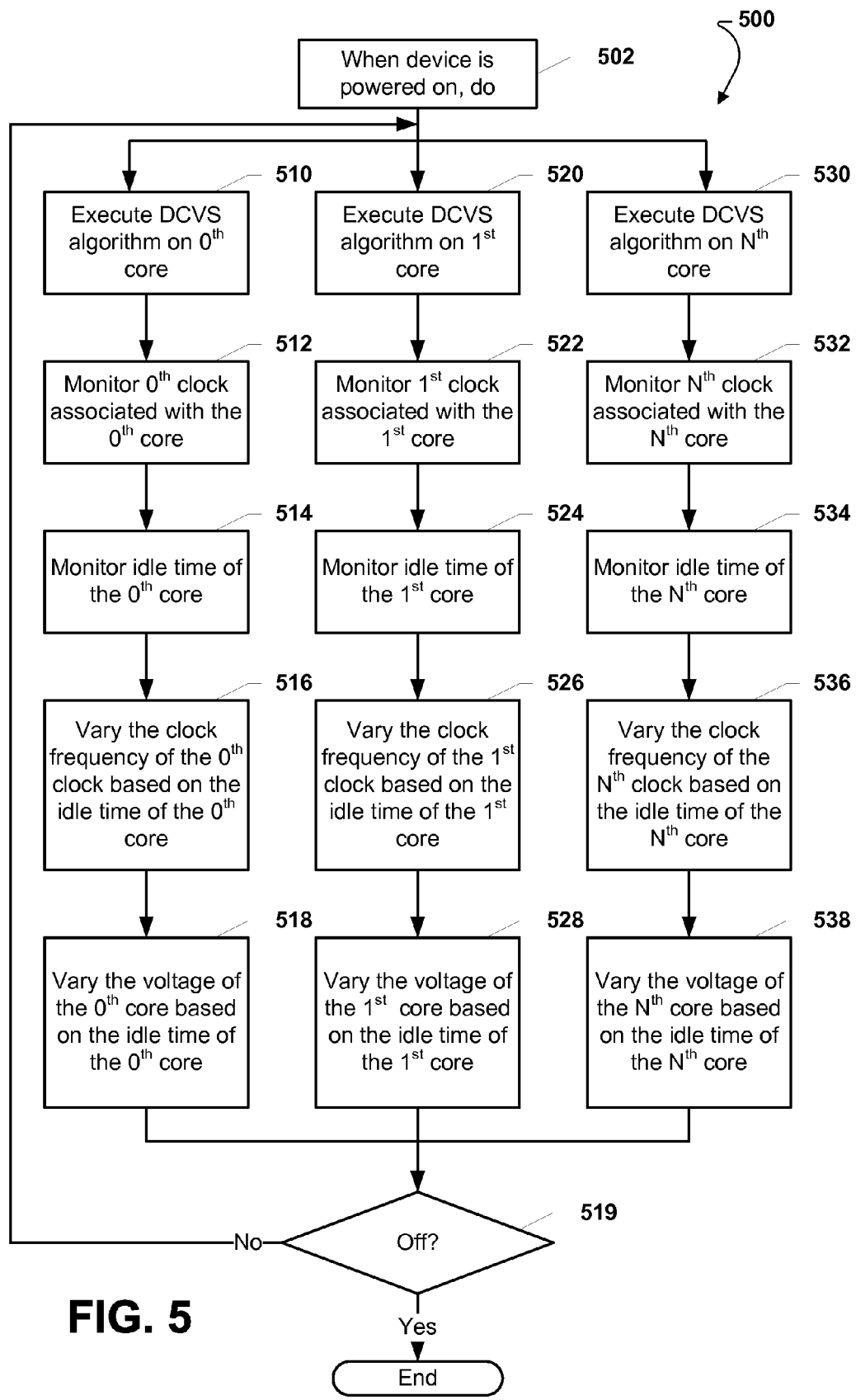
FIG. 5 is a flowchart illustrating a first aspect of a method of asynchronously and independently controlling core clocks in a multicore device.

Referring to FIG. 5, a first aspect of a method of asynchronously and independently controlling core clocks in a multi-core device is shown and is generally designated 500. The method 500 may commence at block 502 with a do loop in which when device is powered on, the following steps may be performed.

At block 510, a zeroth DCVS algorithm may be executed on a zeroth core. Then, at block 512, a zeroth clock associated with the zeroth core may be monitored. Further, at block 514, an idle time associated with the zeroth core may be monitored. At block 516, the clock frequency of the zeroth clock associated with the zeroth core may be varied based on the idle time of the zeroth core. Moreover, at block 518, the voltage of the zeroth core may be varied based on the idle time of the zeroth core.

Moving to decision 519, the power controller may determine whether the device is powered off. If the device is powered off, the method may end. Otherwise, if the device remains powered on, the method 500 may return to a location just after the execution of step 502 and the method 500 may continue as described.

Continuing the description of the method 500, at block 520, a first DCVS algorithm may be executed on a first core. Then, at block 522, a first clock associated with the first core may be monitored. Further, at block 524, an idle time associated with the first core may be monitored. At block 526, the clock frequency of the first clock associated with the first core may be varied based on the idle time of the first core. Moreover, at block 528, the voltage of the first core may be varied based on the idle time of the first core. Thereafter, the method 500 may continue to decision 519 and continue as described herein.

At block 530, an Nth DCVS algorithm may be executed on an Nth core. Then, at block 532, an Nth clock associated with the Nth core may be monitored. Further, at block 534, an idle time associated with the Nth core may be monitored. At block 536, the clock frequency of the Nth clock associated with the Nth core may be varied based on the idle time of the Nth core. Moreover, at block 538, the voltage of the first core may be varied based on the idle time of the first core. Thereafter, the method 500 may continue to decision 519 and continue as described herein.

It may be appreciated that steps 510 through 518, steps 520 through steps 528, and steps 530 through 538 may be executed in parallel. As such, independent, asynchronous clock control may be provided for a clock associated with each core.

Figure 6:
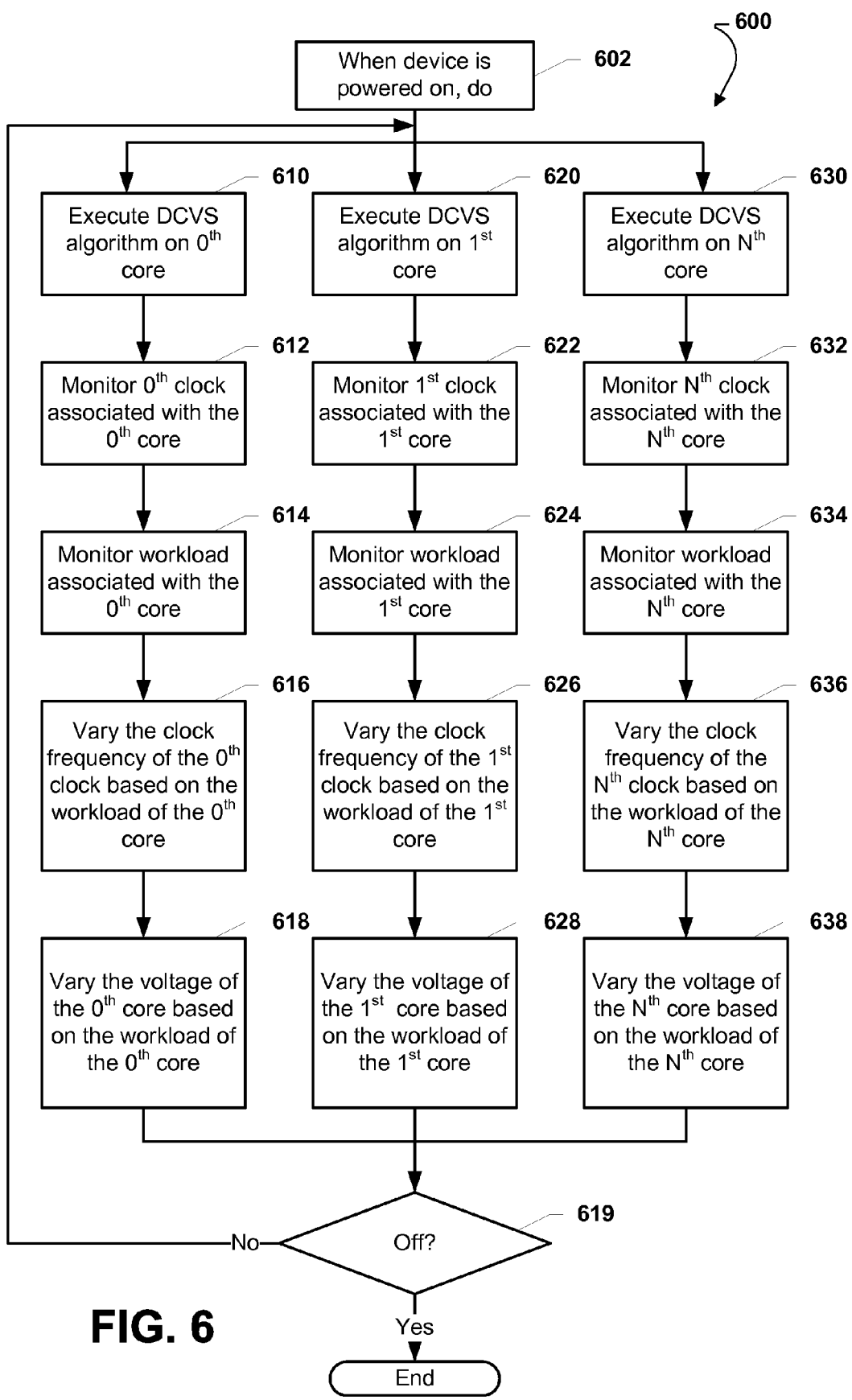
FIG. 6 is a flowchart illustrating a second aspect of a method of asynchronously and independently controlling core clocks in a multi-core device.

Referring to FIG. 6, a second aspect of a method of asynchronously and independently controlling core clocks in a multi-core device is shown and is generally designated 600. The method 600 may commence at block 602 with a do loop in which when device is powered on, the following steps may be performed.

At block 610, a zeroth DCVS algorithm may be executed on a zeroth core. Then, at block 612, a zeroth clock associated with the zeroth core may be monitored. Further, at block 614, a workload associated with the zeroth core may be monitored. At block 616, the clock frequency of the zeroth clock associated with the zeroth core may be varied based on the workload of the zeroth core. Moreover, at block 618, the voltage of the zeroth core may be varied based on the workload of the zeroth core.

Moving to decision 619, the power controller may determine whether the device is powered off. If the device is powered off, the method may end. Otherwise, if the device remains powered on, the method 600 may return to a location just after the execution of step 602 and the method 600 may continue as described.

Continuing the description of the method 600, at block 620, a first DCVS algorithm may be executed on a first core. Then, at block 622, a first clock associated with the first core may be monitored. Further, at block 624, a workload associated with the first core may be monitored. At block 626, the clock frequency of the first clock associated with the first core may be varied based on the workload of the first core. Moreover, at block 628, the voltage of the first core may be varied based on the workload of the first core. Thereafter, the method 600 may continue to decision 619 and continue as described herein.

At block 630, an Nth DCVS algorithm may be executed on an Nth core. Then, at block 632, an Nth clock associated with the Nth core may be monitored. Further, at block 634, a workload associated with the Nth core may be monitored. At block 636, the clock frequency of the Nth clock associated with the Nth core may be varied based on the workload of the Nth core. Moreover, at block 638, the voltage of the first core may be varied based on the workload of the first core. Thereafter, the method 600 may continue to decision 619 and continue as described herein.

It may be appreciated that steps 610 through 618, steps 620 through steps 628, and steps 630 through 638 may be executed in parallel. As such, independent, asynchronous clock control may be provided for a clock associated with each core.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

The system and methods disclosed herein provide completely independent DCVS (a.k.a. DVFS) algorithms that may be executed completely independently on the multiple cores. There is one instance of a DCVS algorithm per core, and each monitors and controls the clock of that core only. The multiple algorithms are allowed to independently set different clock frequencies for the multiple cores.

In one particular aspect, each DCVS algorithm instance may monitor the percentage of idle time spent on each core. The core idle time may be obtained from the operating system or via special external hardware counters, such as a system profiling and diagnostic monitor (SPDM). In another aspect, each DCVS algorithm may monitor a workload characteristic such as task memory-boundedness and independently adjusts frequency based on different task characteristics running on each core.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of controlling core clocks in a multicore central processing unit (CPU), the method comprising:
   executing a zeroth dynamic clock and voltage scaling (DCVS) algorithm on a zeroth core of the multicore CPU; and
   executing a first DCVS algorithm on a first core of the multicore CPU, wherein:
      executing the zeroth DCVS algorithm on the zeroth core causes the multicore CPU to monitor an idle time of the zeroth core and vary a zeroth clock frequency of a zeroth clock associated with the zeroth core based on the idle time and independent of a first clock frequency of a first clock associated with the first core, and
      executing the first DCVS algorithm on the first core causes the multicore CPU to monitor a memory-boundedness of a workload of the first core and vary the first clock frequency of the first clock associated with the first core based on the memory-boundedness of the workload and independent of the zeroth clock frequency of the zeroth clock.

2. A wireless device, comprising:
   means for executing a zeroth dynamic clock and voltage scaling (DCVS) algorithm on a zeroth core of a multicore central processing unit (CPU); and
   means for executing a first DCVS algorithm on a first core of the multicore CPU, wherein:
   means for executing the zeroth DCVS algorithm on the zeroth core comprises:
      means for causing the multicore CPU to monitor an idle time of the zeroth core; and
      means for varying a zeroth clock frequency of a zeroth clock associated with the zeroth core based on the idle time and independent of a first clock frequency of a first clock associated with the first core, and
   means for executing the first DCVS algorithm on the first core comprise:
      means for causing the multicore CPU to monitor a memory-boundedness of a workload of the first core; and
      means for varying the a first clock frequency of the first clock associated with the first core based on the memory-boundedness of the workload and independent of the zeroth clock frequency of the zeroth clock.

3. A wireless device, comprising:
   a processor configured with processor-executable instructions to perform operations comprising:
      executing a zeroth dynamic clock and voltage scaling (DCVS) algorithm on a zeroth core of a multicore central processing unit (CPU); and
      executing a first DCVS algorithm on a first core of the multicore CPU, wherein:
      executing the zeroth DCVS algorithm on the zeroth core causes the multicore CPU to monitor an idle time of the zeroth core and vary a zeroth clock frequency of a zeroth clock associated with the zeroth core based on the idle time and independent of a first clock frequency of a first clock associated with the first core, and
      executing the first DCVS algorithm on the first core causes the multicore CPU to monitor a memory-boundedness of a workload of the first core and vary the a first clock frequency associated with the first core independent based on the memory-boundedness of the workload and of the zeroth clock frequency of the zeroth clock.

4. A non-transitory computer readable storage medium having stored thereon processor-executable software instructions configured to cause a processor to perform operations comprising:
   executing a zeroth dynamic clock and voltage scaling (DCVS) algorithm on a zeroth core of a multicore central processing unit (CPU); and
   executing a first DCVS algorithm on a first core of the multicore CPU, wherein:

executing the zeroth DCVS algorithm on the zeroth core causes the multicore CPU to monitor an idle time of the zeroth core and vary a zeroth clock frequency of a zeroth clock associated with the zeroth core based on the idle time and independent of a first clock frequency of a first clock associated with the first core, and executing the first DCVS algorithm on the first core causes the multicore CPU to monitor a memory-boundedness of a workload of the first core and vary the first clock frequency of the first clock associated with the first core independent based on the memory-boundedness of the workload and of the zeroth clock frequency of the zeroth clock.

\* \* \* \* \*